US011739257B2

(12) United States Patent
Van Slyke et al.

(10) Patent No.: US 11,739,257 B2
(45) Date of Patent: Aug. 29, 2023

(54) HYDRAULIC FRACTURING FLUID

(71) Applicant: SHELL OIL COMPANY, Houston, TX (US)

(72) Inventors: Donald Curtis Van Slyke, Houston, TX (US); Shawn Shaohua Lu, Houston, TX (US)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 17/329,673

(22) Filed: May 25, 2021

(65) Prior Publication Data

US 2022/0380662 A1 Dec. 1, 2022

(51) Int. Cl.
*C09K 8/64* (2006.01)
*C09K 8/60* (2006.01)

(52) U.S. Cl.
CPC ............... *C09K 8/64* (2013.01); *C09K 8/604* (2013.01)

(58) Field of Classification Search
CPC ......... E21B 43/26; E21B 43/267; C09K 8/82; C09K 8/602; C09K 8/604; C09K 8/64
See application file for complete search history.

(56) References Cited

U.S. PATENT DOCUMENTS

| | | | | |
|---|---|---|---|---|
| 5,256,331 A * | 10/1993 | Heitner | .................. | C01B 21/14 507/132 |
| 5,958,845 A | 9/1999 | Van Slyke | | |
| 6,159,907 A | 12/2000 | Van Slyke | | |
| 6,291,406 B1 * | 9/2001 | Rose | ........................ | C09K 8/64 507/239 |
| 6,838,418 B2 | 1/2005 | Allan et al. | | |
| 7,931,088 B2 | 4/2011 | Stegemoeller et al. | | |
| 10,899,955 B2 | 1/2021 | Waterman et al. | | |
| 2010/0252259 A1 * | 10/2010 | Horton | ..................... | C09K 8/64 507/241 |
| 2013/0217604 A1 * | 8/2013 | Fisk, Jr. | .................. | C09K 8/36 507/131 |
| 2014/0121135 A1 * | 5/2014 | Gamage | .................. | C09K 8/36 507/131 |
| 2014/0305651 A1 | 10/2014 | Hill, Jr. et al. | | |
| 2014/0318785 A1 | 10/2014 | Reddy et al. | | |
| 2017/0218254 A1 * | 8/2017 | Ghumare | ................. | C09K 8/74 |
| 2017/0362489 A1 | 12/2017 | Jackson et al. | | |

FOREIGN PATENT DOCUMENTS

WO WO-2011100183 A1 * 8/2011 .......... B01F 17/0071

OTHER PUBLICATIONS

Vantage, Vantage Performance Materials Oil Gas, retrieved Mar. 29, 2022 from https://www.vantagegrp.com/en-US/Product/Page/e0ceb367-cc26-454e-b92b-7ef85b85cbe5/Lumulse-POE-(2)-OLEYLAMINE (Year: 2021).*
Lumulse POE (2) Oleylamine, VANTAGE, retrieved Mar. 29, 22 from https://www.vantagegrp.com/en-US/Product/Page/e0ceb367-cc26-454e-b92b-7ef85b85cbe5/Lumulse-POE-(2)-OLEYLAMINE (wayback machine dated to Jan. 2021) (Year: 2021).*
International Search Report and Written Opinion received for PCT Patent Application No. PCT/EP2022/063668, dated Sep. 14, 2022, 11 pages.

* cited by examiner

*Primary Examiner* — Angela M DiTrani Leff
(74) *Attorney, Agent, or Firm* — SHELL USA, INC.

(57) ABSTRACT

The present invention relates to a hydraulic fracturing fluid composition comprising a homogeneous non-aqueous organic phase mixture which mixture comprises a base fluid and one or more surfactants.

3 Claims, 10 Drawing Sheets

Pellet Immersion Test 1: Wolfcamp A Shale in 2 mls Test Fluid

After 5 mins

After 6 hours

2% KCl 10% GTL Formulation 1 in 2% KCl

Pellet Immersion Test 2: Wolfcamp A Shale in 5 mls Test Fluid

After 30 mins

After 24 hours

Wolfcamp A Shale After TXC Test

2% KCl

100% Sardine LV

10% GTL Formulation 1 in 2% KCl

Wolfcamp A Shale Particles (20-40 Mesh) After Soaking 16 hours in Test Fluid

2% KCl 0.2% GTL Formulation 2 in 2% KCl

SEM Photos of Wolfcamp A Shale Particles
After Immersing 16 hours in Test Fluid and Air Drying for 24 hours 2% KCl 0.2% GTL Formulation 2 in 2% KCl

HYDRAULIC FRACTURING FLUID

FIELD OF THE INVENTION

The present invention relates to a hydraulic fracturing fluid and a process to prepare said fracturing fluid.

BACKGROUND OF THE INVENTION

In hydraulic fracturing, an aqueous mixture comprising mostly water is pumped at high pressure and high flow rate to break (fracture) the formation. Diesel cannot be used in hydraulic fracturing operations due to the potential for contamination of the aquifer with toxic, carcinogenic, partially water-soluble BTEX (benzene-toluene-ethylbenzene-xylene) compounds.

Gas-to-Liquids (GTL) synthetic paraffins were introduced to provide a low cost, environmentally friendly alternative to diesel and conventional mineral oils. They are derived from natural gas using various versions of the Fischer-Tropsch synthesis process. They are composed of 98% slightly branched iso- and normal-paraffins, with 2% or less cycloparaffins, less than 0.05% total aromatics and nearly undetectable BTEX content. This high degree of purity gives them low toxicity, high biodegradability, and good compatibility with elastomers and many surfactants.

For example, in U.S. Pat. No. 6,159,907 an inexpensive GTL synthetic paraffin with 0.1% or less aromatics can be employed as a base liquid component in hydraulic fracturing fluids.

Mineral oils were introduced to offer a low toxicity, less-polluting alternative to diesel. They are derived from petroleum, using various hydrotreating and hydrocracking processes to saturate the aromatic compounds. They are produced in conventional petroleum refineries that convert crude oil into refined products.

Low viscosity (<5 cSt@40° C.), low aromatic mineral oils, often described as Low Toxicity Mineral Oils (LTMOs), differ from most other mineral oils in that they are composed of >99% cyclic, branched and normal paraffins. De-aromatized mixed aliphatic fluids have aromatic contents that are significantly reduced (e.g. to below 0.5%). Such hydrocarbon fluids often contain low BTEX (benzene, toluene, ethylbenzene, xylene) content.

For example, in US2014/0305651 a LTMO in the presence of a thickening agent having "not detected" levels, by GC/Mass Spectrometry, of BTEX is used as hydraulic fracturing fluid.

Hydraulic fracturing fluids known in the industry contain >99% aqueous phase (water and dissolved salts) and less than 1% additives used to enhance performance. Proppant comprising sand or other solids is added to keep the fractures in the shale from closing once the well is placed on production.

A problem with known hydraulic fracturing fluids is that they do not cover the shale surface with a thin layer to protect the shale from dispersing and generating fines. Another problem is that known hydraulic fracturing fluids do not significantly change the wettability of the shale surface. Additionally, the fractures that are created with known hydraulic fracturing fluids do not extend radially far enough away from the wellbore to access a high percentage of the oil and gas in the reservoir. As a result, the flow rate of crude oil relative to water over the surface of the shale when the well is put on production is lower than what can optimally be attained.

SUMMARY OF THE INVENTION

It is an object of the invention to solve or minimize at least of one of the above problems.

It is a further object of the invention to provide a hydraulic fracturing fluid which partially covers the shale surface with a thin layer that protects the shale from dispersing and generating fines, which increases the flowrate of oil and water over the surface of the shale.

It is a further object of the invention to provide a hydraulic fracturing fluid which partially covers the shale surface with a thin layer that increases the wettability of shale, which increases the flowrate of oil relative to water over the surface of the shale.

It is a further object of the invention to provide a hydraulic fracturing fluid that imbibes into the shale, improving the quality and length of the fractures to ensure that the crude oil and gas can more readily flow into the wellbore from the reservoir when the well is put on production.

One of the above or other objects may be achieved according to the present invention by providing a hydraulic fracturing fluid composition comprising a homogeneous non-aqueous organic phase mixture which mixture comprises a base fluid and one or more surfactants.

It has been found that the hydraulic fracturing fluid composition of the present invention partially covers the shale surface with a thin layer that protects the shale from dispersing and generating fines, improves the oil-wettability of the shale, and increases the length of the fractures enabling improved flowrate of crude oil over the surface of the shale.

An advantage of the present invention is that because of the use of one or more specialized surfactants, the homogeneous non-aqueous organic phase mixture disperses in the aqueous fracturing fluid (i.e. forms a direct emulsion) which aids in the adsorption of the homogeneous non-aqueous organic phase mixture by the shale in the microfractures, propped and unpropped areas of the shale fractures.

Another advantage is that the one or more surfactants reside in the homogeneous non-aqueous organic phase mixture and do not separate out or migrate into the water phase. This is a significant performance advantage. The non-polar "tail" or "tails" remain in the homogeneous non-aqueous organic phase mixture and the polar "head" or "heads" extend out into the external aqueous phase. In typical direct emulsions, surfactants mostly reside in the aqueous phase, which wastes most of their effectiveness, especially if the water-to-oil ratio is high.

BRIEF DESCRIPTION OF THE DRAWINGS

The drawing figures depict one or more implementations in accord with the present teachings, by way of example only, not by way of limitation. In the figure, like reference numerals refer to the same or similar elements.

DETAILED DESCRIPTION

Figure 1:
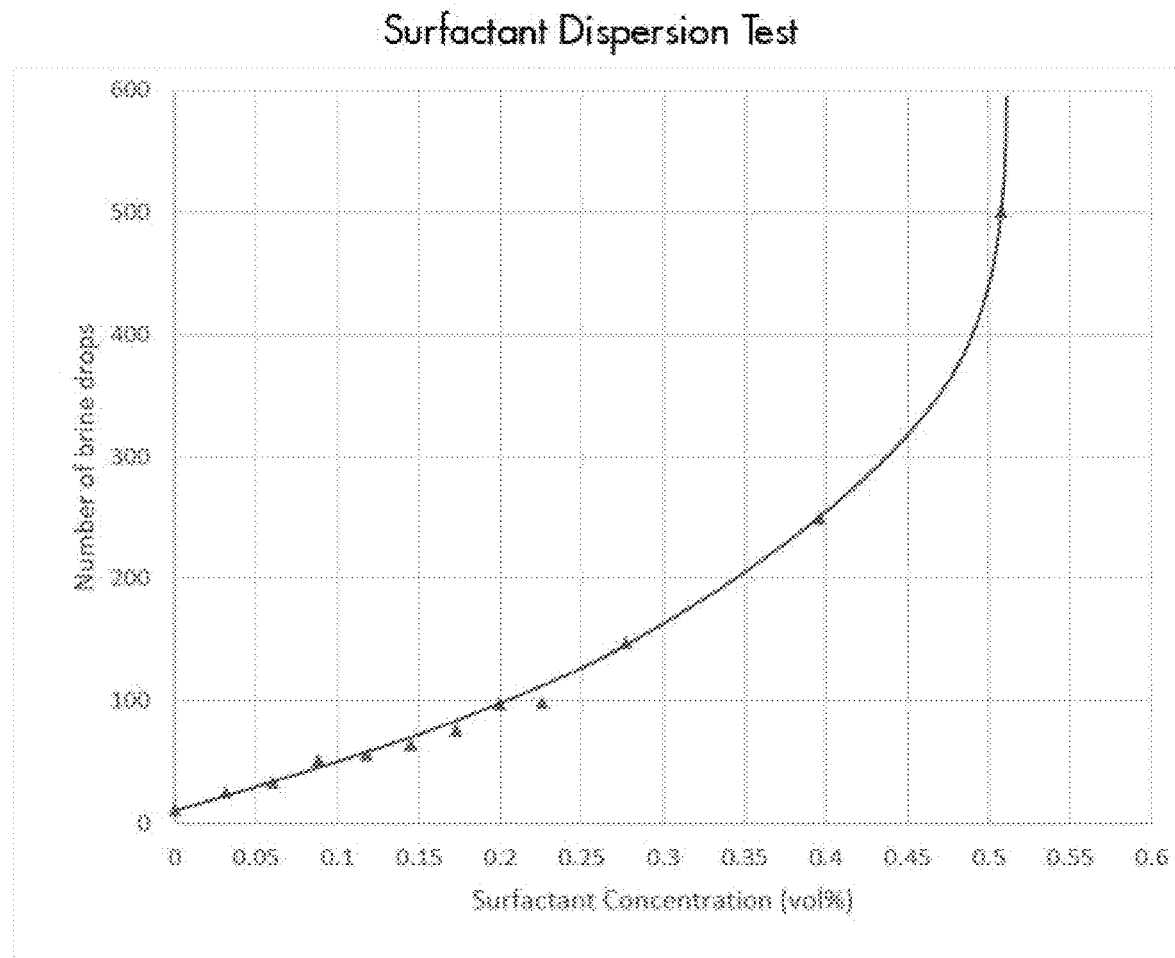
FIG. 1 shows the number of brine drops in view of the concentration of surfactant 1 in GTL.

The following detailed description does not limit the invention. Instead, the scope of the invention is defined by the appended claims.

According to the present invention, the homogeneous non-aqueous organic phase mixture of this invention comprises a base fluid mixed with one or more surfactants and the homogeneous non-aqueous organic phase mixture is dispersed in a low concentration in an aqueous phase to formulate a hydraulic fracturing fluid.

Fluids proposed to be used as the base fluid in the homogeneous non-aqueous organic phase mixtures of this invention or previously proposed to be used as the base fluid or continuous phase for non-aqueous hydraulic fracturing fluids are Gas-to-Liquid (GTL) synthetic paraffins. These GTL synthetic paraffins are known in the industry as Saraline™ 185V, Saraline™ LV, Saraline™ G100, Sarapar™ 103, and Sarapar™ 147. For example, U.S. Pat. No. 6,159,907 discloses the use of GTL synthetic paraffin as the base fluid in non-aqueous hydraulic fracturing fluids.

Other fluids proposed to be use in the homogeneous non-aqueous organic phase mixtures described in this invention or proposed to be used as the base fluid or continuous phase for non-aqueous hydraulic fracturing fluids are low toxicity mineral oils (LTMOs). These LTMOs are known in the industry as Escaid 110, EDC™ 95-11, EDC™ Diamond, EDC™ 170SE, EDC™ 99DW, Lamix™ 30, D70, D80, D90, and D100.

For example, US2014/0305651 discloses the use of LTMO as the base fluid in non-aqueous hydraulic fracturing fluids.

While hydraulic fracturing fluids described in U.S. Pat. No. 6,159,907 and US2014/0305651 are non-aqueous based, the fracturing fluids used in the industry are almost exclusively aqueous based. The hydraulic fracturing fluid of this invention is also aqueous based. However, the homogeneous non-aqueous organic phase mixture in this invention is intended to be mixed in with an aqueous based overall hydraulic fracturing fluid before the overall blend is pumped downhole. The homogeneous non-aqueous organic phase mixture comprises a base fluid (either GTL synthetic paraffin or LTMO) and one or more surfactants.

Water is the most common base fluid for hydraulic fracturing fluid use in the industry. The water contains salts and trace additives. Collectively it is referred to as an aqueous hydraulic fracturing fluid. The aqueous hydraulic fracturing fluid may also contain a small amount of a GTL synthetic paraffin or LTMO used as a carrier to suspend and transport polyacrylamide or guar gum in viscosifier slurries to be injected into the hydraulic fracturing fluid at the surface while the hydraulic fracturing fluid is being pumped downhole or blended in with other components of the aqueous hydraulic fracturing fluid before being pumped downhole. The purpose of the guar gum is to suspend and improve the placement of sand proppant. The purpose of the polyacrylamide is to reduce the friction in the piping to increase the maximum flow rate of aqueous hydraulic fracturing fluid that can be pumped downhole.

Polyacrylamide also provides the suspension of proppant, but to a lesser degree than guar gum. Polyacrylamide or guar slurries can also contain other ingredients such as water, surfactant, and viscosifier.

A conventional hydraulic fracturing fluid used in the industry may contain one or more surfactants in the guar or polyacrylamide slurry added to the aqueous hydraulic fracturing fluid, as well as one or more surfactants in the aqueous hydraulic fracturing fluid itself. These surfactants provide different functions than the one or more surfactants described as part of the homogeneous non-aqueous organic phase in this invention. Likewise, the GTL synthetic paraffin or LTMO used as a carrier for guar or polyacrylamide in a viscosifier slurry provides a different function than the homogeneous non-aqueous organic phase mixture described in this invention.

The homogeneous non-aqueous organic phase mixture of this invention can be dispersed at about 0.1% to 30% in just the pad stage of hydraulic fracturing. The pad stage, pumped ahead of the proppant placement stage, typically does not contain sand proppant. The volume of aqueous hydraulic fracturing fluid in the pad stage is typically ⅕ to ⅓ the volume of hydraulic fracturing fluid used in the proppant placement stage.

The homogeneous non-aqueous organic phase mixture of this invention can be dispersed at about 0.05% to 5% in the full fracturing fluid, including the pad fluid and the proppant placement fluid. Since the overall volume of aqueous hydraulic fracturing fluid is high, often over 5,000,000 gallons per well, there is an advantage of using a lower concentration of the non-aqueous organic phase mixture of this invention in the full hydraulic fracturing fluid (pad and proppant placement stages) compared to using it in just the pad stage.

The homogeneous non-aqueous organic phase mixture of this invention can be dispersed at about 0.05% to 5% in the proppant placement stage of hydraulic fracturing.

The base fluid used in the homogeneous non-aqueous organic phase mixture according to the present invention preferably is a Gas-to-Liquids (GTL) synthetic paraffin or a low toxicity mineral oil.

The GTL synthetic paraffin is prepared by the Fischer-Tropsch process and various modifications thereof. The Fischer-Tropsch process entails reacting carbon monoxide and hydrogen over a catalyst (e.g. iron, ruthenium, or cobalt) to produce synthetic hydrocarbons. Carbon monoxide and hydrogen can be produced from various sources, including natural gas, coal, biomass and water, or through electrolysis. Fischer-Tropsch products are, due to the absence of secondary transformations, linear instead of skewed (e.g. as with olefins) compounds. These paraffin mixtures are mainly composed of slightly branched (mono-methyl, mono-ethyl, multi-methyl, and multi-ethyl branched) iso-paraffins and n-paraffins. The products are subjected to a conversion process (such as the Shell Heavy Paraffin Conversion Process) where (a) olefins present in the Fischer-Tropsch product are hydrogenated, (b) small amounts of oxygenate compounds, mainly primary alcohols, are removed, (c) the Fischer-Tropsch product is hydro-isomerized, and (d) hydrocracked to (iso)-paraffins of a desired chain length and/or boiling range.

Due to the manner in which they are synthesized, the synthetic paraffins are composed of hydrocarbons containing a consecutive number of carbon atoms (i.e., a mixture of hydrocarbons where the carbon atom content of the individual hydrocarbons is $C_n$, $C_{n+1}$, $C_{n+2}$, $C_{n+3}$, etc. and n is a whole number. Generally, the synthetic paraffins are composed of at least 5 hydrocarbons containing a consecutive number of carbon atoms. The synthetic paraffin fractions preferably have boiling ranges similar to kerosenes and/or gasoils produced at conventional petroleum refineries. The synthetic paraffins are commercially available from the Shell Pearl GTL Plant in Qatar and the Shell Middle Distillate Synthesis Plant in Malaysia.

Fischer-Tropsch derived products are HSE-friendly and are, like LTMO, permitted to be used in fracking. Fischer-Tropsch derived products are virtually devoid of BTEX compounds. Fischer-Tropsch derived products are unique in that they are made synthetically to high purity with excellent environmental performance, yet they are relatively inexpensive.

The GTL synthetic paraffin according to the present invention is preferably a GTL synthetic paraffin having from 10 to 16 carbon atoms or GTL synthetic paraffin having from 10 to 24 carbon atoms.

GTL synthetic paraffin having from 10 to 16 carbon atoms, a density at 15° C. according to ASTM D4052 of 767 kg/m³, a Saybolt colour according to ASTM D156 of +30 Min, an initial boiling point of 202° C. and a final boiling point of 256° C. according to ASTMD86, a sulphur content according to ASTM D3120 of less than 1 ppm, aromatics content according to SMS 2728 of 0.04%, a flashpoint according to ASTM D93 of 83° C., a pour point according to ASTMD97 of −39° C. and a kinematic viscosity at 40° C. according to ASTMD445 of 1.8 mm2/s is commercially available from Royal Dutch Shell under the Saraline™ LV tradename.

GTL synthetic paraffin having from 10 to 24 carbon atoms, a density at 15° C. according to ASTM D4052 of 778 kg/m³, a Saybolt colour according to ASTM D156 of +30 Min, an initial boiling point of 200° C. and a final boiling point of 335° C. according to ASTMD86, a sulphur content according to ASTM D3120 of less than 1 ppm, aromatics content according to SMS 2728 of 0.02%, a flash point according to ASTM D93 of 87° C., a pour point according to ASTMD97 of −27° C. and a kinematic viscosity at 40° C. according to ASTMD445 of 2.7 mm2/s is commercially available from Royal Dutch Shell under the Saraline™ 185V tradename.

Preferably, the GTL synthetic paraffin according to the present invention is a GTL synthetic paraffin having a boiling range of from 203 to 256° C. and having from 10 to 16 carbon atoms or a GTL synthetic paraffin having a boiling range of from 200 to 335° C. and having from 10 to 24 carbon atoms.

The wettability of the shale is improved with GTL compared to using conventional aqueous hydraulic fracturing fluids. Wettability as described herein is the ability of a liquid to maintain contact with a shale surface. The degree of wettability is controlled by a force balance between adhesive and cohesive forces. By making the surface of the shale more oil-wet, the crude oil will flow more readily across the surface of the shale on the inside of the fracture, thereby increasing the flow rate of oil during production.

A treatment by GTL synthetic paraffin targeting the propped areas, unpropped areas, and micro-fractures is recommended.

In addition to oil-wetting the exposed surfaces of newly opened fractures, the adsorption of GTL synthetic paraffin by the shale will decrease shale hydration and dispersion, leading to reduced blockage of microfractures, propped and unpropped fractures by swollen shale or fine particle migration. In addition, synthetic paraffin will help to dissolve waxes plugging the fractures, due to its paraffinic composition and "like dissolves like". Saraline™ LV with a relatively low carbon range of $C_{10}$-$C_{15}$ is the preferred GTL fluid for this application. GTL Saraline™ 185V with a carbon range of $C_{10}$-$C_{24}$ will also work but Saraline™ LV is advantageous due to high solubilization of waxes, good dispersion with surfactant, and effective spreading on shale surfaces.

The LTMOs are derived from petroleum, using various hydrotreating and hydrocracking processes to saturate the aromatic compounds. They are produced in conventional petroleum refineries that convert crude oil into refined products. Typically, the LTMOs are composed of >99% cyclic, branched and normal paraffins. De-aromatized mixed aliphatic fluids have aromatic contents that are significantly reduced (e.g. to below 0.5%). Such hydrocarbon fluids often contain low BTEX (benzene, toluene, ethylbenzene, xylene) content. Also the LTMOs have low viscosities, preferably <5 cSt @40° C. The LTMOs may contain hydrocarbons having between 11 to 17 carbon atoms per molecule. Other LTMOs may contain hydrocarbon chain lengths from 9 to 24 carbon atoms per molecule.

Whereas GTL synthetic paraffins and LTMOs have been described in detail, other low toxicity organic phase hydrocarbon fluids with similar properties to the preferred GTL synthetic paraffins and LTMOs can be used, such as linear alpha olefins, internal olefins, polyalphaolefins, vegetable esters, and synthetic esters. Typically, however, the higher cost of these synthetic base fluids makes them less economically attractive than GTL synthetic paraffins and LTMOs.

Suitably, the hydraulic fracturing fluid composition comprises an amount of homogeneous non-aqueous organic phase mixture in a range of from 0.1 to 30.0 volume %, preferably 5 to 15 volume % based on the total amount of hydraulic fracturing fluid in just the pad stage.

Suitably, the hydraulic fracturing fluid composition comprises an amount of homogeneous non-aqueous organic phase mixture in a range from 0.05 to 5.0 volume %, preferably 0.1 to 2 volume % based on the total amount of hydraulic fracturing fluid in just the proppant placement stage.

Suitably, the hydraulic fracturing fluid composition comprises an amount of homogeneous non-aqueous organic phase mixture in a range of from 0.05 to 5.0 volume %, preferably 0.1 to 2 volume % based on the total amount of hydraulic fracturing fluid in the full hydraulic fracturing process, including the pad and proppant placement stages.

Since the overall volume of aqueous hydraulic fracturing fluid is high, often over 5,000,000 gallons per well, there is an advantage of using a lower concentration of the non-aqueous organic phase mixture of this invention in the full hydraulic fracturing fluid (pad and proppant placement stages), or in the proppant placement stage, compared to using it in just the pad stage. However, the concentration of the homogeneous non-aqueous organic phase mixture of this invention in the full hydraulic fracturing fluid (or just the proppant placement stage) should be high enough to permit sufficient coating of the shale to reduce shale dispersion, reduce fines generation, improve oil wettability, dissolve waxes, and/or improve the quality of the fracture structure.

Preferably, the hydraulic fracturing fluid composition according to the present invention comprises a GTL synthetic paraffin having a boiling range from 205 to 256° C. and having from 10 to 16 carbon atoms in an amount in a range of from 0.05 to 5.0 volume %, preferably 0.1 to 2.0 volume % based on the total amount of hydraulic fracturing fluid.

One or more surfactants are added in small, economical concentrations to GTL synthetic paraffin or LTMO to increase the dispersion of GTL paraffin or LTMO in the aqueous fracturing fluid (i.e. form a direct emulsion) and aid in adsorption by the shale in the microfractures, propped and unpropped areas of the fractures. The surfactant resides in the oil (GTL or LTMO) phase and does not separate out or migrate into the water phase. This is a significant performance advantage. The non-polar "tail" remains in the GTL or LTMO phase and the polar "head" extends out into the external water phase. In typical direct emulsions, surfactants mostly reside in the aqueous phase, which wastes most of their effectiveness, especially if the water-to-oil ratio is high.

The linear composition of GTL fluids, comprising mostly slightly branched paraffins with a smaller portion of n-paraffins, is an advantage over low toxic mineral oils (LTMOs). This is because of the improved interaction with surfactants, better spreading on shale, and better HSE performance (i.e. higher biodegradability and lower toxicity). The elastomer compatibility with GTL is higher than with LTMOs, thereby reducing Non-Productive Time (NPT).

Currently there are various "flowback aids" used in the industry that are designed to improve the flowback of aqueous frack fluid to reduce the time for crude oil to flow to the surface. However, they do not improve the flow of oil relative to water. In addition, they have not been proven to be effective enough to significantly enhance the production of crude oil from unconventional shale wells. With the new homogeneous non-aqueous organic phase mixture of this invention in the overall aqueous hydraulic fracturing fluid, the oil flow rate in the fractures is increased, and the relative flow of oil compared to water can be improved. The economics are improved since oil production is the point of drilling and fracking, and water production is an unwanted byproduct.

The primary surfactant used in the hydraulic fracturing fluid according to the present invention is an ethoxylated fatty amine. Ethoxylated fatty amines are nonionic surfactants used as emulsifiers and in formulating emulsifier blends. The production of ethoxylated fatty amine products takes place when the amines like amino acids, tallow amines, oleyl amines, coco amines, stearyl amines etc. are made to react with ethylene oxide in the presence of a catalyst in the ethoxylation process. Fatty amines are nitrogen derivatives of fatty acids, olefins, or alcohols prepared from natural sources, fats and oils, or petrochemical raw materials. The commercially available fatty amines are prepared by either distillation of fatty acids or when fatty alcohols are reacted with ammonia or primary or secondary amines. Some of the popular forms of ethoxylated amines widely used in industrial processes include the tallow amines, coco amines, stearyl amines and oleyl amines.

Fatty amine ethoxylates are generally represented by the formula:

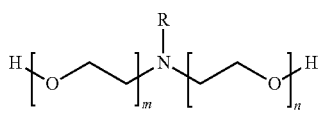

Where m ranges from 1-5, n ranges from 1-5, and R ranges from 10 to 24. If R becomes too low (below 10) then the surfactant's Hydrophilic-to-Lipophilic Balance (HLB) becomes too high to perform well in the intend application of this invention. If R becomes too high (above 24) then the surfactant becomes too wax-like (i.e. solidified at low to moderate temperatures).

The primary surfactant used in the hydraulic fracturing fluid composition is preferably POE (2) Oleylamine, having the CAS number 13127-82-7, the molecular formula $C_{22}H_{45}NO_2$, and goes by various trade names including Lumulse™. For POE (2) Oleylamine, the value of m=1, the value of n=1, and the value of R=18.

The amount of the primary surfactant according to the present invention is preferably in a range of from 0.2 to 20 vol %, more preferably 0.4 to 14 vol %, and most preferably 1 to 12 vol %, based on the total amount of homogeneous non-aqueous organic phase mixture including primary surfactant. It is advantageous to have a high enough concentration of primary surfactant in the non-aqueous organic phase mixture to disperse the GTL synthetic paraffin or LTMO in the aqueous hydraulic fracturing fluid. It is also advantageous to have a high enough concentration of primary surfactant in the homogeneous non-aqueous organic phase mixture to enhance the coating and spreading of homogeneous non-aqueous organic phase mixture onto the surface of the shale, to enhance the imbibition of homogeneous non-aqueous organic phase mixture into the micropore structures of the shale, and minimize shale dispersion and fines generation. However, if the concentration of primary surfactant is too high then the cost of the homogeneous non-aqueous organic phase mixture will be too high.

The concentration of primary surfactant based on the total amount of aqueous hydraulic fracturing fluid used in the full fracturing process (i.e. both pad and proppant placement stages) or only used in just the proppant placement stage ranges from 0.004% to 0.8%, preferably from 0.01 to 0.2%, and most preferably about 0.024%.

The concentration of primary surfactant based on the total amount of aqueous hydraulic fracturing fluid used in only the pad fracturing stage ranges from 0.02 to 0.9%, preferably from 0.05 to 0.5% and most preferably about 0.1%.

The ratio of GTL synthetic paraffin or LTMO to primary surfactant in the homogeneous non-aqueous organic phase mixture is between 500 to 1 and 19 to 1, preferably between 250 to 1 and 32 to 1, and most preferably 99 to 1.

The hydraulic fracturing fluid according to the present invention—in addition to GTL or LTMO and primary surfactant comprising the homogeneous non-aqueous organic phase mixture, may also comprise a secondary surfactant.

The secondary surfactant used in the hydraulic fracturing fluid according to the present invention is a dimer fatty acid amine. It is the reaction product of a fatty acid and polyamine. This dimer fatty acid amine has a distribution of hydrocarbon chain lengths. It is formed by the reaction of diethylenetriamine (CAS number 111-40-0) with fatty acid. The resulting product is a mixed amide. The secondary surfactant improves the adhesion onto the shale surface of the GTL or LTMO-based homogeneous non-aqueous organic phase (i.e. GTL or LTMO formulation). This helps in targeting the GTL or LTMO formulation to partially coat the shale in the fractures and also increases the durability of the GTL formulation on the shale surface to minimize rinsing off the shale by aqueous fluid in the hydraulic fracturing stages and also minimize mobilization of the GTL formulation away from the shale surface during the production of crude oil or produced water.

The amount of the secondary surfactant according to the present invention is preferably in a range of from 0 to 5 volume %, more preferably in a range of from 0.1 to vol %, most preferably 3 vol %, based on the total amount of homogeneous non-aqueous organic phase mixture including primary surfactant.

It is advantageous to have a high enough concentration of secondary surfactant in the homogeneous non-aqueous organic phase to reduce the dispersion of shale and minimize fines generation in the fractures. However, if the concentration of secondary surfactant is too high then the cost of the homogeneous non-aqueous organic phase will be too high.

The concentration of secondary surfactant based on the total amount of aqueous hydraulic fracturing fluid used in the full fracturing process (i.e. both pad and proppant placement stages) ranges from 0 to 0.25%, preferably from 0 to 0.06%, and most preferably from 0 to 0.006%.

The concentration of secondary surfactant based on the total amount of aqueous hydraulic fracturing fluid used in only the pad fracturing stage ranges from 0 to 0.25%, preferably from 0 to 0.06% and most preferably about 0.006%.

The ratio of GTL synthetic paraffin or LTMO to secondary surfactant in the homogeneous non-aqueous organic phase mixture is between 100 to 0 and 21 to 1. The ratio of primary surfactant to secondary surfactant is typically 4 to 1.

Although it is not the intent for the GTL or LTMO to release from the shale surface once it has become attached, there can be circumstances such as with wax solubilization in the removal of wax plugs that small amounts of GTL or LTMO will flow back to the refinery with the crude oil. This is not expected to cause upsets at the refinery. In fact, the value of GTL or LTMO is higher than the value of the crude oil, so instead of the GTL or LTMO being "wasted", the refinery will receive high value hydrocarbon product added into its feed stream.

The hydraulic fracturing fluid according to the present invention may—in addition to GTL or LTMO and one or more surfactants—further comprise fracturing fluid additives that are well known in the art. The fracturing fluid additives are not particularly limited as long as they do not interfere with the desired properties of the embodied fracturing fluids. The fracturing fluid includes one or more of the following: water, inorganic salts, polyacrylamide, guar gum, sand or ceramic proppant, corrosion inhibitor, scale inhibitor, biocide, clay stabilizer, cross linker (for guar systems), breaker (for guar systems), terpene, non-aqueous fluid (for a carrier in a viscosifier slurry—including but not limited by the non-aqueous fluid in the present invention), suspending agent (to help suspend guar or polyacrylamide viscosifier in a viscosifier slurry), and surfactant (for a flowback aid or dispersant in a viscosifier slurry—including but not limited by the one or more surfactants in the present invention).

Because the fracturing fluids according to the enclosed embodiments are intended to be non-toxic, these optional ingredients are preferably also non-toxic.

In a further aspect, the present invention provides a process to prepare a hydraulic fracturing fluid according to the present invention, which process comprises the following steps:
(a) blending of one or more surfactants into GTL synthetic paraffin or LIMO to form a homogeneous non-aqueous organic phase mixture;
(b) blending the mixture of step (a) with aqueous hydraulic fracturing fluid to form a hydraulic fracturing fluid formulation.

Processes to prepare fracturing fluids are known in the art and therefore not described here in detail. Typical processes to prepare hydraulic fracturing fluid formulations are for example described in U.S. Pat. No. 6,838,418B2 and U.S. Pat. No. 7,931,088B2.

The preferred method for applying the homogeneous non-aqueous organic phase mixture to the shale surfaces within the fractures is to disperse the mixture into the aqueous fracturing fluid in a low concentration. The blend can be dispersed at about 0.05% to 5.0% in the aqueous hydraulic fracturing fluid when employed in both the pad and proppant placement stages of fracturing. Alternatively, the homogeneous non-aqueous organic phase mixture can be dispersed at about 0.1% to 30% in just the pad stage of hydraulic fracturing. The pad stage, pumped ahead of the proppant placement stage, typically does not contain sand proppant. The volume of aqueous hydraulic fracturing fluid in the pad stage is typically ⅕ to ⅓ the volume of hydraulic fracturing fluid used in the proppant placement stage.

In another aspect the present invention provides a method for applying a homogenous non-aqueous organic phase mixture to the shale surface within the fractures, the method comprising dispersing a homogenous non-aqueous organic phase mixture comprising a base fluid and a) a primary surfactant or b) a primary and secondary surfactant in the aqueous fracturing fluid in the pad stage or the pad stage and proppant placement stages or the proppant placement stage of hydraulic fracturing.

In one embodiment the hydraulic fracturing fluid composition comprises an amount of homogeneous non-aqueous organic phase mixture in a range of from 0.1 to 30.0 volume %, preferably 5 to 15 volume % based on the total amount of hydraulic fracturing fluid in just the pad stage. Preferably, the concentration of primary surfactant based on the total amount of aqueous hydraulic fracturing fluid used in only the pad fracturing stage ranges from 0.02 to 0.9%, preferably from 0.05 to 0.5 and most preferably about 0.1%.

In another embodiment the hydraulic fracturing fluid composition comprises an amount of homogeneous non-aqueous organic phase mixture in a range of from 0.05 to 5.0 volume %, preferably 0.1 to 2 volume % based on the total amount of hydraulic fracturing fluid in the full hydraulic fracturing process, including the pad and proppant placement stages or based on the amount of hydraulic fracturing fluid in just the proppant placement stage. Preferably, the concentration of primary surfactant based on the total amount of aqueous hydraulic fracturing fluid used in the full fracturing process (i.e. both pad and proppant placement stages) or just the proppant placement stage ranges from 0.004% to 0.8%, preferably from 0.01 to 0.2%, and most preferably about 0.024%

The present invention is described below with reference to the following Examples, which are not intended to limit the scope of the present invention in any way.

EXAMPLES

The following sections describe the experiments that demonstrate the advantages of GTL in the proposed method, and how the mechanism is expected to enhance the flow of crude oil in the field.

Hydraulic Fracturing Fluid Compositions

The components of the GTL Formulations and main hydraulic fracturing fluid are shown below.
Traditional Frack Fluid (TFF)
99% Produced water (water containing ions)
1% Other chemicals (OC)

Hydraulic Fracturing Additives (Other Chemicals as a Percentage of OC)
10%-50% Guar gum or polyacrylamide
10%-60% Oil carrier (LTMO or synthetic paraffin)
2%-10% Surfactant
2%-10% Trace chemicals (TC)
  Biocide
  Scale inhibitor
  Clay stabilizer
  Cross linker (for guar systems)
  Breaker (for guar systems)
GTL Formulation #1 (GTL1-a Homogeneous Non-Aqueous Organic Phase Mixture of this Invention)
99% Saraline™ LV
1% POE (2) Oleylamine (Surfactant 1)
GTL Formulation #2 (GTL2-a Homogeneous Non-Aqueous Organic Phase Mixture of this Invention)
85% Saraline™ LV
12% POE (2) Oleylamine (Surfactant 1)
3% fatty acid amine (Surfactant 2)

Example 1

Surfactant Dispersion Test

To demonstrate the enhanced performance of GTL in fracking, tests were conducted to identify an optimal surfactant to reduce interfacial tension and aid in dispersing GTL in the aqueous fracturing fluid and improve spreading of GTL on the shale surface and imbibition of GTL by the shale. The preferred surfactant (Surfactant 1) is a highly effective wetting agent and dispersant. It produces ultra-low interfacial tension as indicated by the large drop numbers in the dispersion test result shown in FIG. 1.

In the dispersion test, 50 ml of GTL Saraline™ 185V (marketed in North and South America as Neoflo™ 4633) containing up to 0.51 vol % Surfactant 1 was used. The desired volume of 25 wt % CaCl$_2$) in water was slowly injected into the Saraline™ 185V/Neoflo™ 4633 and surfactant mixture using a syringe with a flat-headed injection port. The number of aqueous droplets were counted and recorded. The higher the number of drops, the lower the interfacial tension between the non-aqueous and aqueous phases.

The results showed that the number of drops increased exponentially as the concentration of Surfactant 1 in GTL was increased from 0.4 vol % to 0.51 vol %, indicating a very powerful dispersion that nearly resembled the formation of a microemulsion. It was encouraging that this behavior was achieved with a very low surfactant concentration. The surfactant, POE (2) Oleylamine, is readily available, relatively inexpensive and has low toxicity. It is marketed under various product names including Lumulse™.

Example 2

Shale Pellet Tests

Shale pellet tests were conducted to compare the effectiveness of various aqueous systems with and without the GTL formulation in inhibiting the swelling and dispersion of shale. There are several advantages of preventing the swelling and dispersion of shale in the hydraulic fracturing process. Shale swelling narrows the width of the fractures, limiting the placement of sand proppant and reducing the openings in the shale required for flow of crude oil when the well is put on production. When the shale is softened, then proppant can become embedded in the shale instead of its main function which is keeping the fractures from closing. When the shale is softened then it typically disperses, releasing fines that restrict the flow of crude oil through the fractures and through the sand proppant.

2% KCl was used to represent the aqueous hydraulic fracturing fluid. 2% KCl is similar to a hydraulic fracturing fluid in that it contains predominantly water and has a similar inhibitive effect on shale dispersion as produced water containing ions in solution from the formation. Produced water is typically used to make up the water portion of the hydraulic fracturing fluid before chemicals are added.

The pellets were made from Wolfcamp A shale samples representative of the producing formations in the Permian Basin, Tex. Wolfcamp A shale was ground into fine particles (40 to 80 mesh) then compressed into ½" diameter×¼" length pellets using 15,000 psi pressure. The pellets were immersed in tap water or 2% KCl aqueous fluids (representing the inhibitive level of produced water in aqueous fracturing fluids) with or without various concentrations GTL formulations containing Saraline™ LV and one or more surfactants.

Pellet Test 1

In Pellet Test 1, a Wolfcamp A shale pellet was immersed in 2 mls of 2% KCl in one case and in another case a pellet was immersed in 2 mls of 2% KCl containing 10% (100 gpt) GTL Formulation 1.

Figure 2:
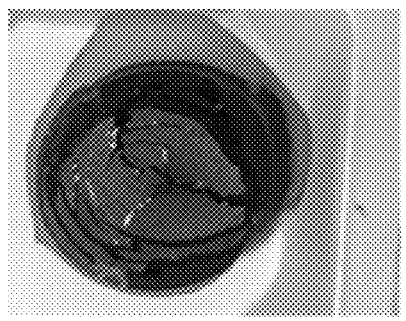
FIG. 2 shows immersion of the Wolfcamp A shale in 2 mL 2% KCl and 2 mL 10% emulsion of GTL formulation 1 after 5 minutes and after 6 hours.
Figure 2:
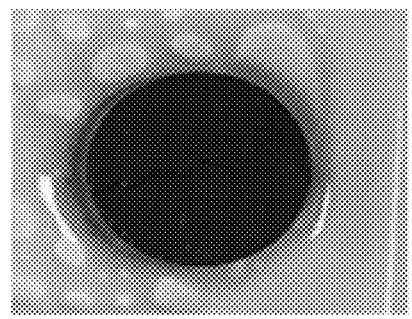
Figure 2:
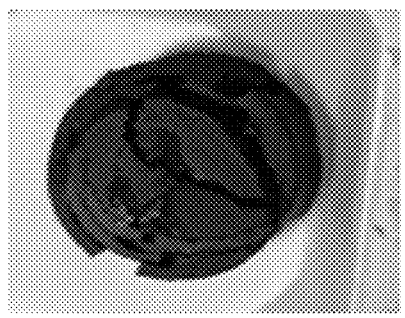
Figure 2:
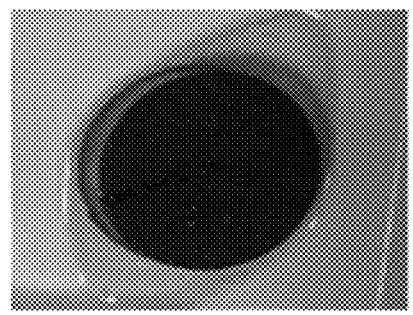

The results are shown in FIG. 2. After soaking for 5 minutes and after soaking for 6 hours, there was significant dispersion of the shale with pure 2% KCl compared to almost no dispersion of shale with 10% GTL Formulation 1 in 2% KCl. The 10% emulsion of GTL Formulation 1 provided protection for the shale pellet. In the 10% GTL Formulation 1 case, the emulsified Saraline™ LV showed a high tendency to be adsorbed by the pellet, thereby protecting the pellet and preventing it from becoming dispersed by the water.

Pellet Test 2

In Pellet Test 2, ½" diameter×¼" length shale pellets (made from the same Wolfcamp A core slab used in Pellet Test 1) were immersed in 5 mls of aqueous fluids. These fluids either consisted of fresh water, 2% KCl without any GTL Formulation, or 2% KCl containing either 0.2% (2 gpt) GTL Formulation 1 or 2.

Figure 3:
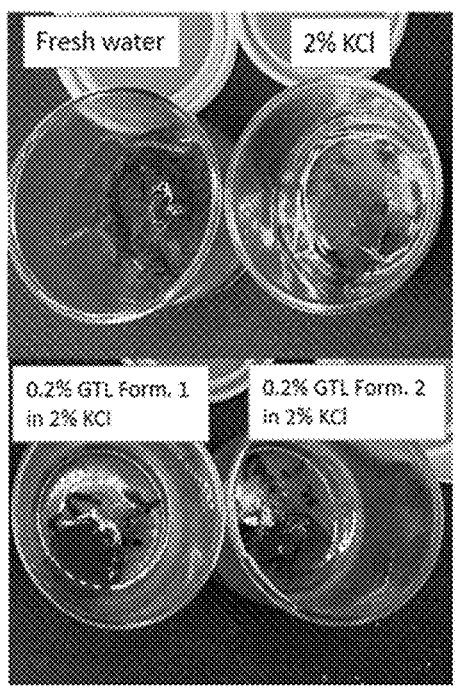
FIG. 3 shows immersion of Wolfcamp A shale in 5 mL fluids: fresh water, 2% KCl without GTL, 2% KCl containing either 0.2% GTL formulation 1 or 2.
Figure 3:
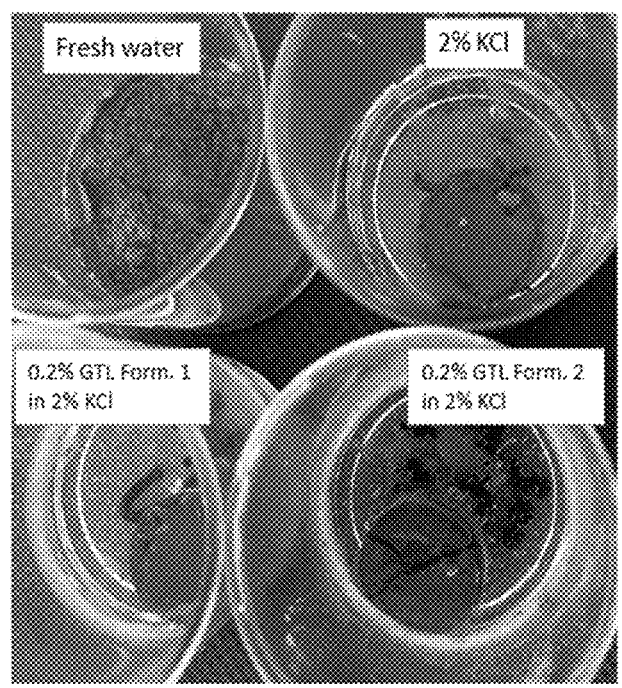

The results shown in FIG. 3 indicate that at only 0.2% concentration, GTL Formulation 1 and GTL Formulation 2 are effective at reducing the swelling and dispersion of Wolfcamp A shale.

Example 3

Imbibition Tests

Imbibition Test 1

Figure 4:
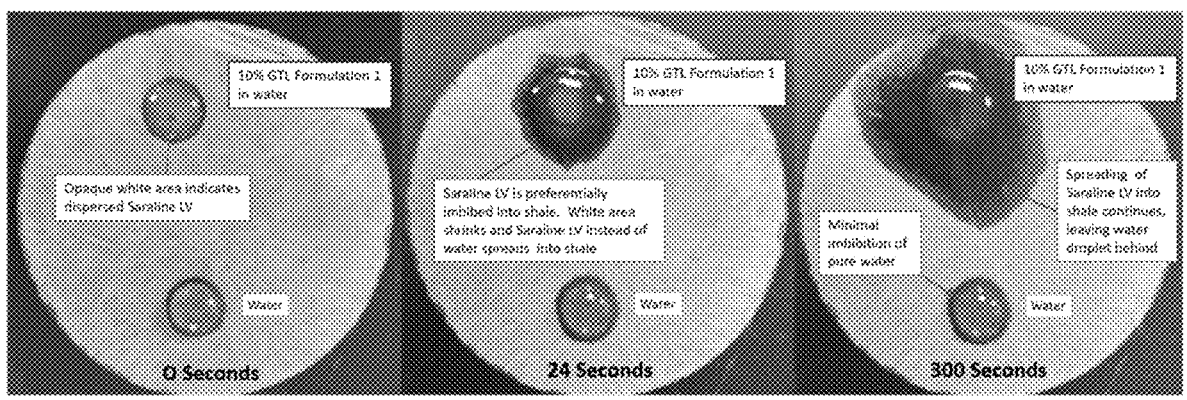
FIG. 4 shows imbibition of Saraline™ LV/surfactant 1 by Wolfcamp A shale.

To help demonstrate the wetting and spreading behavior of Saraline™ LV on surfaces, a benchtop imbibition test was conducted with Wolfcamp A shale. Surfactant 1 was blended into Saraline™ LV at a concentration of 1%. The Saraline™ LV/Surfactant 1 blend was dispersed in tap water (without KCl) at a concentration of 10%. The milky dispersion thus had a concentration of 0.1% of Surfactant 1. A drop of this dispersion was placed on the shale surface. The flat shale surface was made from a Wolfcamp A core plug that was 1.5" diameter×1" length. The results are shown in FIG. 4. After 24 seconds, the Saraline™ LV/Surfactant 1 blend was preferentially imbibed by the shale instead of water. This was indicated by the visible shrinking of the opaque area of the drop and emergence of an imbibed area of Saraline™ LV/Surfactant 1 rapidly spreading away from the drop. After 300 seconds, the Saraline™ LV/Surfactant 1 blend had virtually all been imbibed by the shale, leaving only water in the drop on the surface. For comparison, a drop of pure water was shown to have only slightly spread into the shale after 300 seconds. This test showed that when the frack fluid containing Saraline™ LV/Surfactant 1 is pumped into microfractures and unpropped areas, it is expected that the adsorption and coating of the shale by Saraline™ LV should occur even when 90% of the frack fluid consists of water.

Imbibition Test 2

Another type of imbibition test was conducted to quantify the rate of imbibition of fluids by Wolfcamp A shale. Each core plug of Wolfcamp A shale was cut to 1" diameter×1" length. Each core was coated with an epoxy seal on the outer diameter of the core plug. The core plug was immersed in the test fluid. The test fluid containing the core plug was placed in a container that was immersed in a water bath held at a temperature of 140° F. The increase in weight of the core plug due to imbibition of the test fluid was measured over a 9-minute time period.

Figure 5:
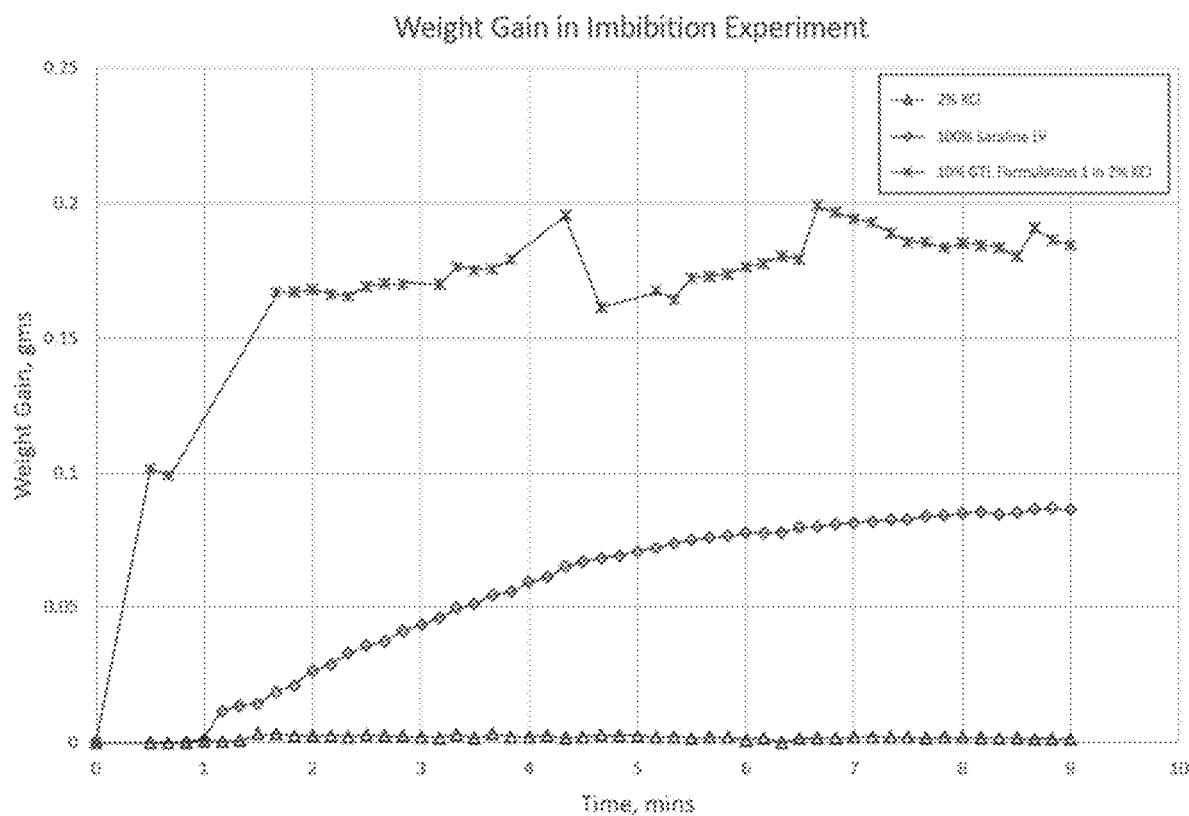
FIG. 5 shows the weight gain in the imbibition experiment.

The Imbibition Test 2 result is shown in FIG. 5. There was a rapid imbibition of the emulsion containing 10% Saraline™ LV (with 1% Surfactant 1 in the Saraline™ LV for emulsification) in 2% KCl. There was increased imbibition of 100% Saraline™ LV compared to pure 2% KCl. There was very little uptake of pure 2% KCl by the core during the duration of the test. This result provides quantitative evidence of the ability of Saraline™ LV to rapidly fill the micropore spaces in the Wolfcamp A shale and the benefit of emulsification of Saraline™ LV with Surfactant 1.

Triaxial Compressive Strength (TXC) Tests

Triaxial compressive strength (TXC) tests were conducted to determine the effect of exposure from various fluids on Wolfcamp A shale after being subjected to pressure causing the core sample to "fail", simulating the fracturing process. Each core plug was cut from the same Wolfcamp A shale sample. The samples were cut to 1" diameter×2" length plugs. The Wolfcamp A plugs were immersed in 300 mls of three different fluids, 2% KCl, 100% Saraline™ LV, and 10% Saraline™ LV (containing 1% of Surfactant 1) in 2% KCl. A stack was constructed consisting of the core plug sandwiched between two end caps. At a constant ambient confinement pressure condition, the core samples were axially loaded up through mechanical failure at a constant strain rate of $1\times10^{-5}$ strains/second. Finally, the core plug samples were unloaded from the load frame after failure and photos were taken to determine the quality, direction and length of the fractures.

Figure 6:
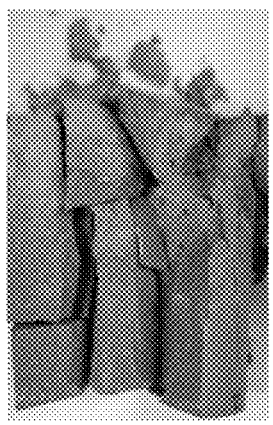
FIG. 6 shows the Wolfcamp A shale after TXC test.
Figure 6:
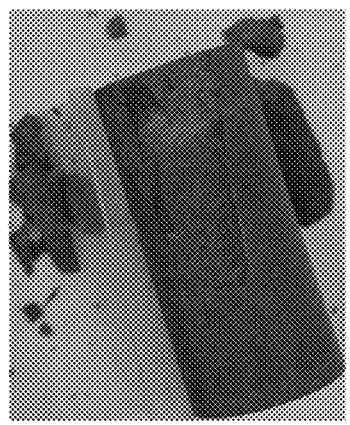
Figure 6:
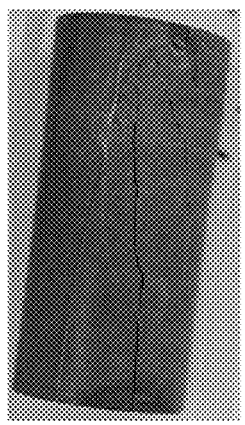

FIG. 6 shows that core samples that were first immersed in 100% Saraline™ LV and 10% Saraline™ LV (containing 1% Surfactant 1) in 2% KCl remained mostly intact after failure in the TXC test, with only long vertical fracturing. Conversely, the core sample that was immersed in pure 2% KCl prior to the TXC test was relatively disaggregated with both vertical and horizontal fractures. Horizontal fractures are less desirable than vertical fractures because they decrease the length of the fracture network radially away from the wellbore, thereby limiting the ability of the fractures to access reservoirs containing oil and gas that are further away from the wellbore than the near-wellbore area. Long, high quality vertical fractures provide consistent pathways with oil and gas flowing directly from the reservoir to the wellbore. When shorter, lower quality fractures occur with horizontal paths between the fractures, then the flow of crude oil and gas becomes more bogged down because the flow of oil and gas is both perpendicular to the wellbore and parallel to the wellbore. An analogy would be traveling from one point to another using a freeway to reduce travel time for the maximum number of cars to travel from point A to point B, instead of traveling from the same point A to point B on city blocks with intersections containing cross-traffic, thereby limiting the number of cars and speed they travel at.

After failure the size distributions of the shale pieces were determined. These shale pieces were sieved through 20 mesh and 100 mesh screens. For the larger pieces, the diameter was calculated based on the weight.

Figure 7:
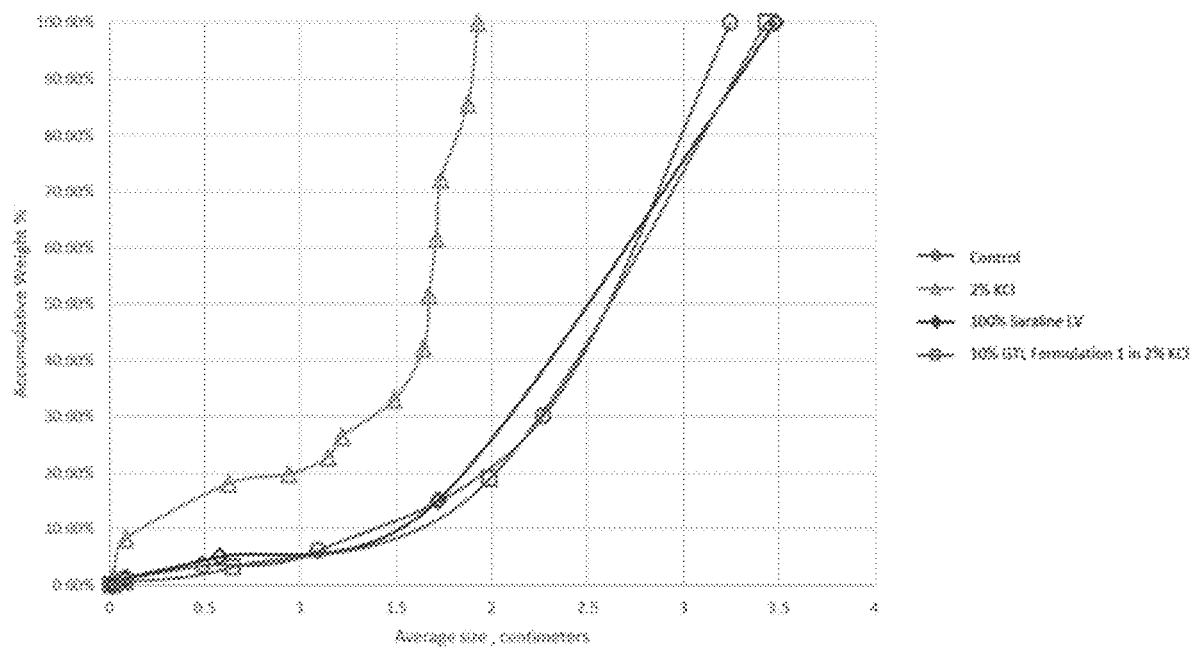
FIG. 7 shows the size distributions of the shale pieces after the TXC test.

FIG. 7 shows that the particles were significantly larger with the core that was imbibed with pure Saraline™ LV and with the core that was imbibed with 10% Saraline™ LV emulsified in 2% KCl (with 1% surfactant in the Saraline™ LV), compared to the core that was imbibed with pure 2% KCl. In the field, the fines generated during fracturing will significantly damage the formation and reduce oil production. The TXC test showed that Saraline™ LV will improve the quality of the fractures and decrease the generation of fines.

Shale Column Test

A shale column test was conducted to determine the effects of coating shale particles with GTL Saraline™ LV formulations on crude oil production. Shale pieces ground from Wolfcamp A shale formation core slabs were used. The comparison was made with crude oil recovered from the same source as the Wolfcamp A shale.

The column was prepared by mixing 50 to 80 mesh Wolfcamp A Shale pieces 50-50 with 50 to 80 mesh sand. The column was packed with 100 grams of the shale/sand mixture. Then 100 grams of treatment fluid (2% KCl, 100% Saraline™ LV, or 10% GTL Formulation 1 in 2% KCl) was placed into the column to fully immerse the solids mixture. The treatment fluid was allowed to soak for 1 hour. After soaking, the treatment fluid was flowed by gravity through the solid mixture until the treatment fluid reached the top of the solids. Then, 100 grams of West Texas crude was placed above the treatment fluid in the column. The residual treatment fluid and crude oil flowing out of the bottom of the column was collected and the amount recorded as flow rate in grams/minute.

Figure 8:
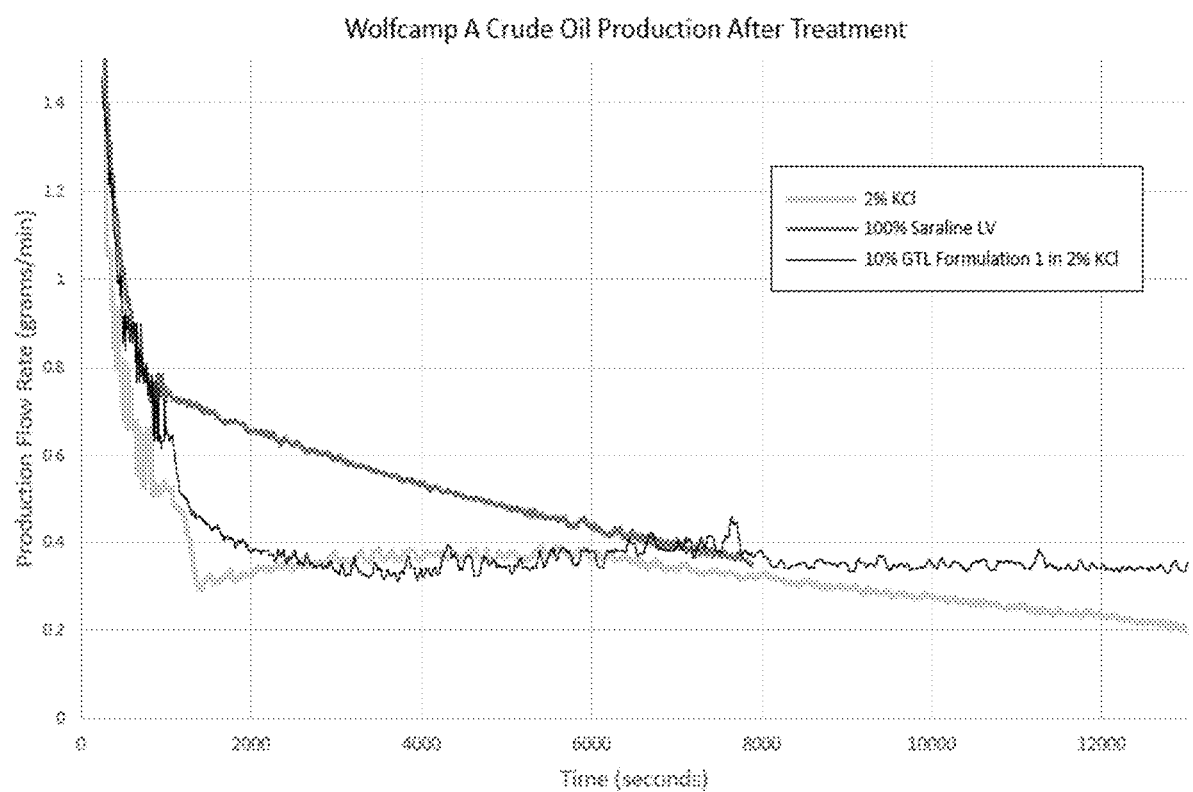
FIG. 8 shows Wolfcamp A crude oil production after treatment.

The results in FIG. 8 show the benefits of treating the shale/sand solids mixture with GTL Saraline™ LV. After soaking the solids mixture with just 2% KCl, the crude oil flow rate was 0.2 grams/min at the end of the test. Whereas after soaking the mixture with 10% GTL Formulation 1 in 2% KCl, the crude oil flow rate was 75% higher at 0.35 grams/min at the end of the test. Moreover, in the last phase of the test the relative flow rate of crude for the case where the shale/sand had been soaked with 10% GTL Formulation 1 in 2% KCl was increasing over time compared to the flow rate for the case where the shale/sand had been soaked with just 2% KCl. The column test shows the benefits of coating the shale with GTL Saraline™ LV in improving the flow rate of crude oil through the shale. The best performance was with 100% GTL Saraline™ LV coating the shale/sand mixture, with flowrates exceeding 0.5 grams per minute. The flow rate was so high with 100% GTL Saraline™ LV that the column ran out of crude oil after 8000 seconds (about 2.2 hours).

Shale Dispersion Test

Figure 9:
FIG. 9 shows Wolfcamp A Shale Particles (20-40 Mesh) after soaking 16 hours in Test fluid.
Figure 9:

A shale dispersion test was conducted to determine the effect of soaking Wolfcamp A shale for 16 hours in the test fluid on the consistency of the shale and the generation of fine solids. A 10 gram sample of Wolfcamp A shale ground to 20-40 mesh size was immersed in 15 grams of test solution containing either 2% KCl or 0.2% (2 gpt) GTL Formulation 2 in 2% KCl. After soaking, the shale and test solution mixture was poured over a 40 mesh screen. The treated shale particles, shown in FIG. 9, were clumped together with a thick layer of water surrounding them after exposure to just 2% KCl, whereas after soaking in 0.2% GTL Formulation 2 in 2% KCl the particles were easily separated, angular shaped with sharp edges, and retained less water on their surfaces.

Figure 10:
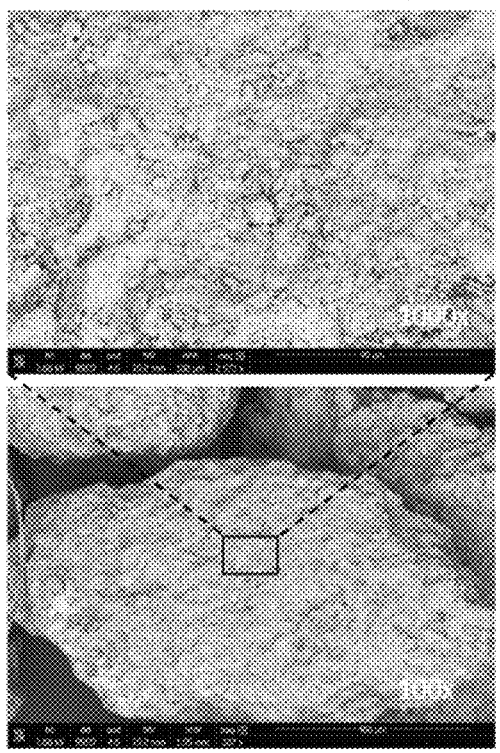
FIG. 10 shows SEM photos of Wolfcamp A Shale particles after immersing 16 hours in test fluid and air drying for 24 hours.
Figure 10:
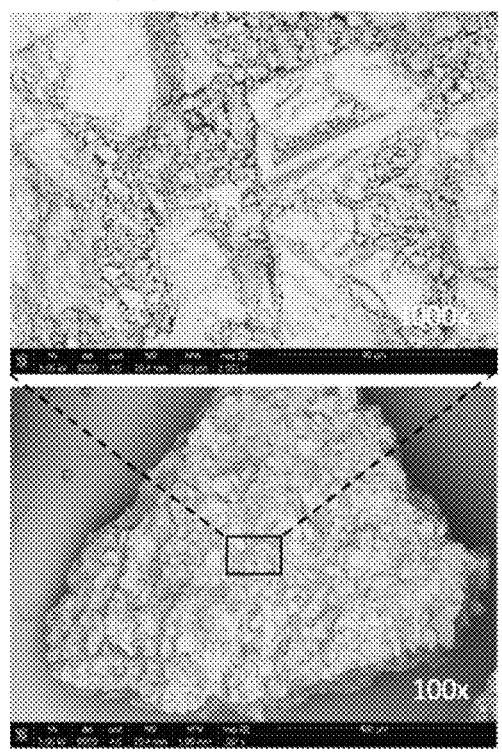

The shale particles were air dried for 24 hours, then scanning electron microscope (SEM) photos were taken, as shown in FIG. 10. The SEM photos show a similar contrast between soaking without GTL Formulation 2 and soaking with GTL Formulation 2. At 100× magnification the particle from the 2% KCl-only soak is relatively rounded with a relatively large amount of fines attached. In contrast, at 100× magnification the particle from the GTL Formulation 2 in 2% KCl soak is more angular with sharper edges and less fines attached. Increasing the magnification to 1000× further indicates that there are more angular surfaces remaining and less fines generated with the shale soaked in 0.2% GTL Formulation 2 in 2% KCl compared with the shale soaked in just 2% KCl.

The invention claimed is:

1. An aqueous based hydraulic fracturing fluid composition comprising, based on a total amount of hydraulic fracturing fluid composition, at least 90 vol. % water and 0.2 vol. %, based on a total amount of hydraulic fracturing fluid composition, of a homogeneous non-aqueous organic phase mixture comprising 85 vol. % of a Gas-to-Liquids (GTL) synthetic paraffin having from 10 to 16 carbon atoms, a density at 15° C. according to ASTM D4052 of 767 kg/m$^3$, a Saybolt colour according to ASTM D156 of +30 Min, an initial boiling point of 202° C. and a final boiling point of 256° C. according to ASTMD86, a sulphur content according to ASTM D3120 of less than 1 ppm, aromatics content according to SMS 2728 of 0.04%, a flashpoint according to ASTM D93 of 83° C., a pour point according to ASTMD97 of −39° C. and a kinematic viscosity at 40° C. according to ASTMD445 of 1.8 mm$^2$/s, 12 vol. % POE (2) Oleylamine, and 3 vol. % fatty acid amine, based on the amount of the homogenous non-aqueous organic phase mixture in the hydraulic fracturing fluid composition.

2. A process to prepare a hydraulic fracturing fluid, which process comprises:
   (a) blending one or more surfactants into a Gas-to-Liquids (GTL) synthetic paraffin to form a homogeneous non-aqueous organic phase mixture which comprises a base fluid and one or more surfactants; and
   (b) blending the mixture of step (a) with aqueous hydraulic fracturing fluid to form a hydraulic fracturing fluid composition,
   wherein the hydraulic fracturing fluid composition comprises, based on a total amount of hydraulic fracturing fluid composition, at least 90 vol. % water and 0.2 vol. %, based on a total amount of hydraulic fracturing fluid composition, of a homogeneous non-aqueous organic phase mixture comprising 85 vol. % of a GTL synthetic paraffin having from 10 to 16 carbon atoms, a density at 15° C. according to ASTM D4052 of 767 kg/m$^3$, a Saybolt colour according to ASTM D156 of +30 Min, an initial boiling point of 202° C. and a final boiling point of 256° C. according to ASTMD86, a sulphur content according to ASTM D3120 of less than 1 ppm, aromatics content according to SMS 2728 of 0.04%, a flashpoint according to ASTM D93 of 83° C., a pour point according to ASTMD97 of −39° C. and a kinematic viscosity at 40° C. according to ASTMD445 of 1.8 mm$^2$/s, 12 vol. % POE (2) Oleylamine, and 3 vol. % fatty acid amine, based on the amount of the homogenous non-aqueous organic phase mixture in the hydraulic fracturing fluid composition.

3. A method for applying a homogenous non-aqueous organic phase mixture to a shale surface within fractures, the method comprising dispersing a homogenous non-aqueous organic phase mixture comprising a base fluid and one or more surfactants in aqueous fracturing fluid, in a stage of hydraulic fracturing selected from a pad stage, a proppant placement stage, and combinations thereof, wherein the dispersing provides a hydraulic fracturing fluid composition comprising, based on a total amount of hydraulic fracturing fluid composition, at least 90 vol. % water and 0.2 vol. %, based on a total amount of hydraulic fracturing fluid composition, of a homogeneous non-aqueous organic phase mixture comprising 85 vol. % of a Gas-to-Liquids (GTL) synthetic paraffin having from 10 to 16 carbon atoms, a density at 15° C. according to ASTM D4052 of 767 kg/m$^3$, a Saybolt colour according to ASTM D156 of +30 Min, an initial boiling point of 202° C. and a final boiling point of 256° C. according to ASTMD86, a sulphur content according to ASTM D3120 of less than 1 ppm, aromatics content according to SMS 2728 of 0.04%, a flashpoint according to ASTM D93 of 83° C., a pour point according to ASTMD97 of −39° C. and a kinematic viscosity at 40° C. according to ASTMD445 of 1.8 mm$^2$/s, 12 vol. % POE (2) Oleylamine, and 3 vol. % fatty acid amine, based on the amount of the homogenous non-aqueous organic phase mixture in the hydraulic fracturing fluid composition.

* * * * *

UNITED STATES PATENT AND TRADEMARK OFFICE
CERTIFICATE OF CORRECTION

| | |
|---|---|
| PATENT NO. | : 11,739,257 B2 |
| APPLICATION NO. | : 17/329673 |
| DATED | : August 29, 2023 |
| INVENTOR(S) | : Donald Curtis Van Slyke et al. |

It is certified that error appears in the above-identified patent and that said Letters Patent is hereby corrected as shown below:

In the Specification

In Column 6, Line 4, delete "$C_{10}$-$C_{15}$" and insert -- $C_{10}$-$C_{16}$ --.

In Column 7, Line 66, delete "Where" and insert -- where --.

In Column 9, Line 3, delete "to" and insert -- to 5 --.

In Column 9, Line 63, delete "LIMO" and insert -- LTMO --.

In Column 10, Line 51, delete "0.024%" and insert -- 0.024%. --.

In the Claims

In Column 16, Line 26, in Claim 3, delete "in" and insert -- in an --.

Signed and Sealed this
Fourteenth Day of November, 2023

Katherine Kelly Vidal
*Director of the United States Patent and Trademark Office*